July 24, 1928.

A. H. LIGHT 1,678,151

PISTON STRUCTURE

Filed May 3, 1927   2 Sheets-Sheet 1

INVENTOR.
ARTHUR H. LIGHT.

BY Townsend, Loftus & Abbett
ATTORNEYS.

July 24, 1928.
A. H. LIGHT
1,678,151
PISTON STRUCTURE
Filed May 3, 1927
2 Sheets-Sheet 2
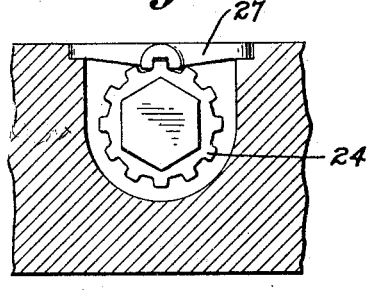
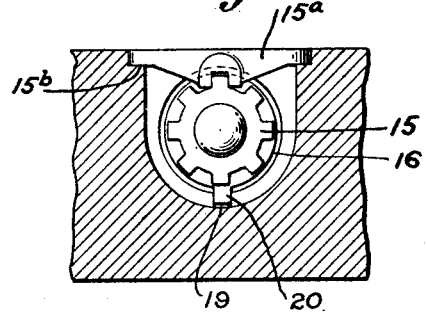
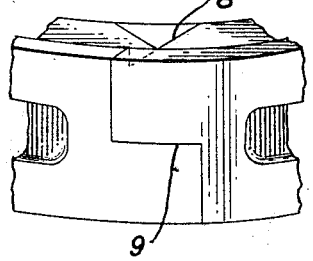
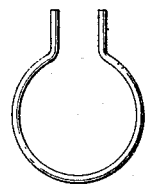
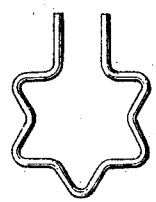
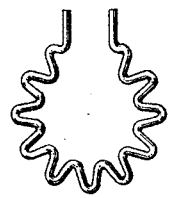
INVENTOR.
ARTHUR H. LIGHT.
BY
Townsend, Loftus & Abbett
ATTORNEYS.

Patented July 24, 1928.

1,678,151

UNITED STATES PATENT OFFICE.

ARTHUR H. LIGHT, OF OAKLAND, CALIFORNIA.

PISTON STRUCTURE.

Application filed May 3, 1927. Serial No. 188,418.

This invention relates to a piston and especially to a floating type of piston ring therefor.

The object of the present invention is to generally improve and simplify the construction and operation of piston and particularly the piston rings carried thereby; to provide a ring which consists of a plurality of segments; to provide means whereby radial movement of each segment is permitted and whereby the radial movement may be restricted and adjusted; to provide other means whereby the segments may be automatically expanded as wear takes place; to provide means whereby excessive pressure and wear between the ring segments and a cylinder surface may be substantially reduced; and further to provide means whereby the entire piston ring structure such as the segments, restricting means etc., may be mounted so as to float with relation to the piston proper.

One form which the invention may assume is shown by way of illustration in the accompanying drawings, in which:

Figs. 3 and 4 are detail sectional views showing the type of nut and screw lock employed, Fig. 5 is a perspective view showing the overlapping ends of a pair of segments, Figs. 6, 7 and 8 are detail views showing different types of copper wire restricting members.

Figure 1:
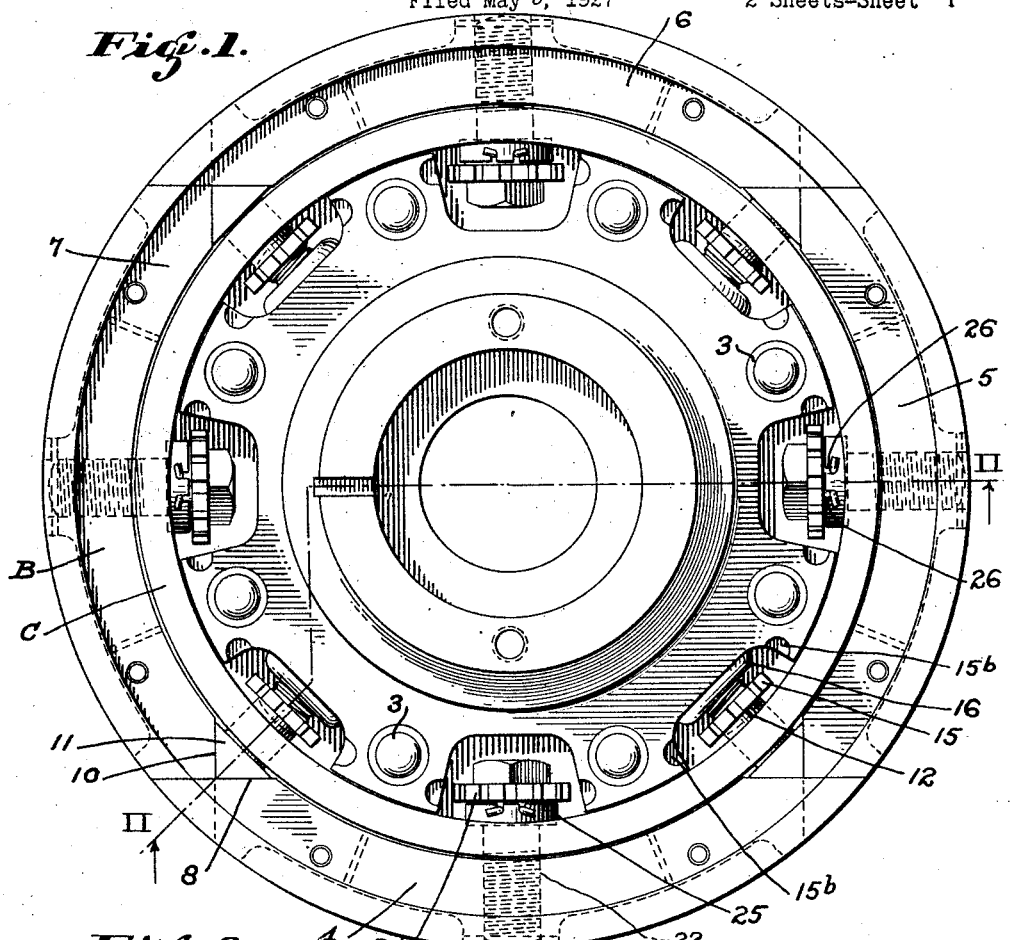
Fig. 1 is a plan view of the piston showing the follower head removed.
Figure 2:
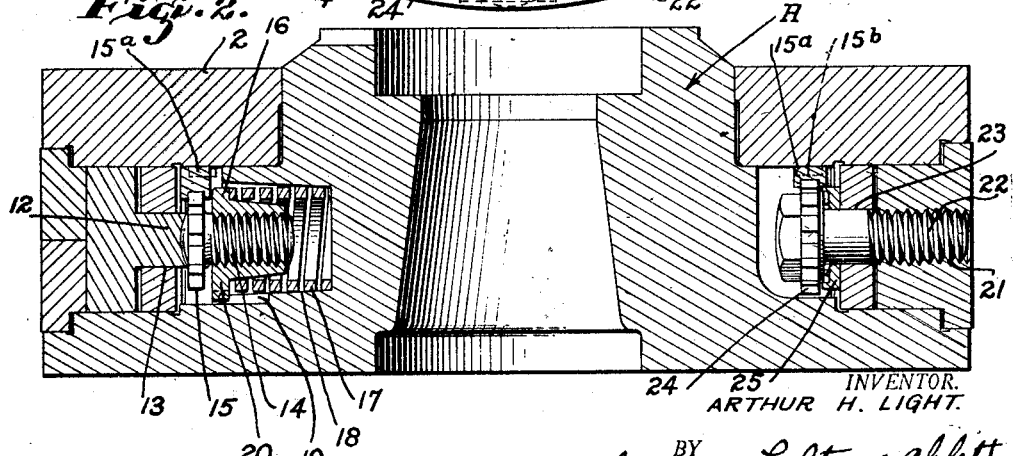
Fig. 2 is a cross section of the piston taken on line II—II, Fig. 1.

Referring to the drawings in detail and particularly Figs. 1, 2 and 5, A indicates in general the body portion of a piston, 2 a follower head, and 3 a series of bolts whereby the follower head is secured with relation to the body of the piston. Formed intermediate the follower head and the lower portion of the piston is an annular groove which is provided for the reception of a pair of rings generally indicated at B and C. The ring C will hereinafter be referred to as the floating ring, while the ring B will be referred to as the packing ring.

Before proceeding with a detail description of the packing ring and the floating ring, it might be stated that the present invention is an improvement or modification over the structure disclosed in my co-pending application entitled "Piston structure," filed July 20, 1926, Serial No. 123,634. Practically every feature disclosed in the present application is shown and described in detail in my co-pending application referred to and the following description will accordingly be fairly brief.

The packing ring B as disclosed in the present instance consists of four segments generally indicated at 4, 5, 6 and 7. The ends of the segments are cut on an angle of substantially 45 degrees as indicated at 8 with relation to a radial line drawn from the center of the piston. The ends are offset as indicated at 9 and they accordingly overlap each other. A V-shaped pocket is formed on the rear side of each segment joint as indicated at 10 and a V-shaped block 11 is adapted to be inserted in each pocket. The V-shaped blocks 11 serve two main functions, first that of forming a seal between the overlapping ends of the segments, and secondly that of forcing the segments outwardly in a radial direction. Means must, however, be provided whereby radial outward movement of the segments is limited and this will later be described. Each V-shaped block is provided with an inwardly projecting stud 12 which passes through an opening 13 formed in the floating ring. A screw 14 provided with a castellated nut 15 engages the inner end of the stud. The screw carries a nut 16 and a spring 17 is interposed between the nut and the piston proper. There are four V-shaped blocks 11 employed in the present instance, four screws 14, four springs 17, etc. and pockets 18 are formed on the piston body to receive and guide the springs. The lower end of each pocket is provided with a groove 19 and each nut 16 is provided with a lug 20 which projects into the groove; the nut is thus locked against rotation and when the castellated nut 15 and screw 14 are rotated the nut will advance longitudinally of the screw and as such will increase or decrease the compression of the spring 17 as required or in other words, increase or decrease the pressure exerted by the V-shaped blocks 11 against the joints of the piston ring segments. A sectional detail end view of the screw 14 and the castellated nut 15 is shown in Fig. 4. It will be noted that a locking bar 15$^a$ is employed. This bar interlocks with one or another of the wings of the castellated nut. It is supported in recesses 15$^b$ and as such is secured when the follower head 2 is applied.

The bar in turn secures the castellated nut and the screw against rotation and after nut 16 has once been adjusted to obtain the spring tension desired, all parts are rigidly locked and secured so that the adjustment will be maintained.

The method of limiting or restricting outward radial movement of the several segments of the ring B is best illustrated in Figs. 1 and 2. Each segment is provided with a centrally drilled opening 21 which is drilled to receive a screw 22. This screw passes through an opening 23 formed in the floating ring C and is provided with a castellated nut or head 24 on its inner end. A grooved washer 25 is interposed between the floating ring and the nut 24 and this washer is provided for the reception of a compressible soft, metallic wire washer or ring such as disclosed in Figs. 6, 7 and 8. The upper side of the washer is slotted as indicated at 26 in Fig. 1 and the ends of the wire or washer may thus be brought through and bent over. A copper wire or the like may be employed. If a comparatively small area is required, a single piece of wire is employed as indicated in Fig. 6; if a larger area is required, the wire is bent as shown in Fig. 7; and if a still larger area is required the bends or corrugations may be further increased as shown in Fig. 8. By rotating the castellated nuts 24 the outward radial movement of the individual segments may be regulated and when such adjustment is obtained a locking bar 27 such as shown in Fig. 3 is inserted. This bar engages one or another of the wings of the castellated nut 24 and the bar itself is secured when the follower head is applied. Any change of adjustment is thus positively prevented. It should here be noted that the restricting means, i. e., the screws 22 whereby radial outward movement is limited is in this instance carried entirely by the floating ring C. This is exceedingly important and is one of the main features of the present application. The floating ring is permitted a certain amount of free movement with relation to the groove and the piston and as the segmental ring B is attached to or carried by the floating ring, a certain amount of free movement as far as the segmental or packing ring is concerned, is permitted, this being desirable in certain installations as the cylinder walls are not always perfectly aligned with the crank shaft and connecting rod, cross-head etc. Hence, desiring a reciprocal movement of the piston, a slight freedom of movement of the packing ring is desirable so that the packing ring may follow the cylinder wall.

In actual practice it is known that the piston body and the follower head are usually of smaller diameter than the diameter of the cylinder in which they operate. This diameter increases with wear. There is accordingly a certain amount of wobbling or radial movement of the piston with relation to the cylinder. Such movement forces the individual segments inwardly and the springs 18 in turn force the segments outwardly with relation to the groove and the piston during each reciprocal movement, and the copper wires or washers shown in Figs. 6, 7 and 8 are thus subjected to alternate compression and relief, or in other words, to what is commonly known as a hammering action. This hammering action although very slight causes a gradual compression of the copper or soft metal wires and it is due to the compression that the ring segments are gradually advanced as wear takes place. Any disalignment between the cylinder and the piston is taken care of due to the floating action of the ring C and the segments carried thereby. The gradual compression of the copper wires or washers is, however, not sufficient to take up all of the wear during the entire life of the ring segments but it does relieve the engineer of the necessity of removing the follower head 2 to readjust the segments as often as would otherwise be the case. It is accordingly necessary from time to time to remove the follower head and the locking bars indicated at $15^a$ and 27 to readjust the restricting screws 22 so that the segments can be further advanced from time to time as wear takes place.

While certain features of the present invention are more or less specifically described and indicated, I wish it understood that various changes may be resorted to within the scope of the appended claims; similarly, that the materials and finish of the several parts employed may be such as the manufacturer may dictate or varying conditions or uses may demand.

Having thus described my invention, what I claim and desire to secure by Letters Patent is:—

1. A piston of the character described having an annular groove formed in its peripheral surface, a floating ring mounted in said groove, a second ring consisting of a plurality of segments mounted in the groove exteriorly of the floating ring, means engageable with the segments to force them outwardly in a radial direction and means carried by the floating ring whereby outward radial movement of the segments is limited.

2. A piston of the character described having an annular groove formed in its peripheral surface, a floating ring mounted in said groove, a second ring consisting of a plurality of segments mounted in the groove exteriorly of the floating ring, means engageable with the segments to force them outwardly in a radial direction and an adjustable connection between each segment and the floating ring whereby outward radial movement of each segment is limited.

3. A piston of the character described having an annular groove formed in its peripheral surface, a floating ring mounted in said groove, a second ring consisting of a plurality of segments mounted in the groove exteriorly of the floating ring, means engageable with the segments to force them outwardly in a radial direction, a connection between each segment and the floating ring whereby outward radial movement of each segment is limited and a compressible metallic member interposed between each connection and the floating ring whereby gradual outward radial movement of each segment is permitted as wear of the rings takes place.

4. A piston of the character described having an annular groove formed in its peripheral surface, a ring consisting of a plurality of segments mounted in the groove means engageable with each segment to force the segments outwardly in a radial direction, a floating ring mounted in the groove interiorly of the segmental ring, a plurality of screws, one for each segment carried by the floating ring and turnable with relation thereto, a threaded engagement formed between each screw and adjacent segment, said screws when turned causing radial adjustment of the individual segments and also limiting their outward movement with relation to the floating ring.

5. A piston of the character described having an annular groove formed in its peripheral surface, a ring consisting of a plurality of segments mounted in the groove means engageable with each segment to force the segments outwardly in a radial direction, a floating ring mounted in the groove interiorly of the segmental ring, a plurality of screws, one for each segment carried by the floating ring and turnable with relation thereto, a threaded engagement formed between each screw and adjacent segment, said screws when turned causing radial adjustment of the individual segments and also limiting their outward movement with relation to the floating ring and means for locking the screws against turning movement when the segments have been adjusted.

6. A piston of the character described having an annular groove formed in its peripheral surface, a ring consisting of a plurality of segments mounted in the groove, means engageable with each segment to force the segments outwardly in a radial direction, a floating ring mounted in the groove interiorly of the segmental ring, a plurality of screws, one for each segment carried by the floating ring and turnable with relation thereto, a threaded engagement formed between each screw and adjacent segment, said screws when turned causing radial adjustment of the individual segments and also limiting their outward movement with relation to the floating ring, a head member on the inner end of each screw and a ring of compressible metal interposed between the head of each screw and the floating ring.

7. In a piston of the character described having an annular groove formed in its peripheral surface, a ring consisting of a plurality of overlapping segments mounted in the groove, said segments at their overlapping ends having V-shaped pockets formed on the rear sides, a V-shaped sealing block adapted to be received by each pocket, a spring interposed between each V-shaped block and the piston to force the blocks and the segments outwardly in a radial direction, a floating ring mounted in the groove interiorly of the piston ring, segments and the V-shaped blocks and means carried by the floating ring whereby radial outward movement of the individual segments is limited.

8. In piston of the character described having an annular groove formed in its peripheral surface, a ring consisting of a plurality of overlapping segments mounted in the groove, said segments at their overlapping ends having V-shaped pockets formed on the rear sides, a V-shaped sealing block adapted to be received by each pocket, a spring interposed between each V-shaped block and the piston to force the blocks and the segments outwardly in a radial direction, a floating ring mounted in the groove interiorly of the piston ring, segments and the V-shaped blocks and an adjustable connection between each segment and the floating ring whereby outward radial movement of each segment is limited.

ARTHUR H. LIGHT.